UNITED STATES PATENT OFFICE.

JOHN L. CHADWICK, OF BELLEVILLE, NEW JERSEY, ASSIGNOR OF THREE-FOURTHS TO WILLIAM H. LYMAN, OF TOTTENVILLE, NEW YORK.

METHOD OF RECLAIMING INDIA-RUBBER AND FIBER FROM SCRAPS OF INDIA-RUBBER CLOTH.

SPECIFICATION forming part of Letters Patent No. 288,013, dated November 6, 1883.

Application filed February 12, 1883. (No specimens.)

*To all whom it may concern:*

Be it known that I, JOHN L. CHADWICK, of Belleville, in the county of Essex and State of New Jersey, have invented a new and useful Improvement in the Method of Reclaiming India-Ruber and Fiber from Scraps of India-Rubber Cloth, of which the following is a specification.

In the manufacture of various articles of rubber cloth—such, for example, as overshoes—the rubber is first prepared for vulcanization and rolled out, and the fabric or fibrous material, which is often composed of wool and cotton, is applied to it, and is retained by the natural adhesive properties of the rubber. In cutting out articles from such rubber cloth considerable scrap is produced, and it is desirable to reclaim the rubber and any wool which is in the fabric adhering to the rubber. Many plans have been devised for accomplishing this result; and the object of my invention is to provide a more desirable method for reclaiming the rubber and wool from the scrap.

To this end my invention is an improvement in the method of reclaiming rubber and wool from scraps of rubber cloth the fibrous material of which is composed of wool and cotton, consisting in first subjecting the scraps to the action of muriatic acid to destroy the cotton and release the wool from the rubber, leaving the wool intact, and in subsequently subjecting the scraps to a beating and picking action to detach the wool from the rubber.

My invention is applicable to the treatment of scrap the fibrous material of which consists of wool and cotton—such as a fabric having a cotton back and a wool face—and the destruction of the cotton by the acid loosens or frees the wool more or less from the rubber, and renders its entire removal and preservation easy.

In carrying out my invention I take any suitable quantity of scrap and immerse it in a solution of muriatic acid of a strength of about 10° Baumé. I heat the acid to a temperature of from 200° to 212° Fahrenheit, or to about the temperature of boiling water, and stir the scrap from time to time during a period of about two hours, more or less, after which the scrap is taken out and dried by passing it through a wringer or otherwise. The dried scrap is then passed through a wool-picker, which beats out and blows off all the dust of the destroyed cotton and loosens and removes the wool. Stray fibers of wool may still adhere to the rubber, and to destroy these I immerse the scrap in a solution of caustic soda of about 22° Baumé. I heat the caustic soda to a temperature of from 200° to 212° Fahrenheit, and stir from time to time for a period of from one to two hours; but before placing the rubber in the caustic soda solution it should be thoroughly washed with water to remove every trace of the muriatic acid. The large proportion of the wool is removed by the wool-picker and saved, and what remains after the beating or picking operation is entirely destroyed by the caustic-soda, leaving the rubber in suitable condition to be reworked.

I am aware that it is not new to subject scraps of rubber cloth to the action of muriatic or hydrochloric acid for the purpose of destroying the cotton fibers attached to the scrap; and I therefore do not claim such treatment, broadly, as of my invention.

My invention is confined to the treatment of scraps the fibrous portion of which is composed of wool and cotton.

The object of my invention is twofold—first, to reclaim the scrap rubber, and to obtain it free from fibrous materials; and, secondly, to reclaim the wool. I am not aware that this twofold result has ever been attained prior to my invention. By the first step of my process I destroy the cotton, and by the second step—*i. e.*, the subjecting the scrap to the beating and picking action, I secure the wool, which is valuable and fit for again mixing with cotton to make rubber cloth.

I do not seek to cover, broadly, the treatment of scraps of rubber cloth by an acid, nor do I claim, broadly, the treatment of such scraps by an alkali; but

What I claim as my invention, and desire to secure by Letters Patent, is—

The improvement in the method of reclaiming india-rubber and wool from scraps of india-rubber cloth the fibrous material of which is composed of wool and cotton, consisting in first subjecting the scraps to the action of muriatic acid to destroy the cotton and release the wool from the rubber, leaving the wool intact, and in subsequently subjecting the scraps to a beating and picking action to detach the wool from the rubber, substantially as herein described.

JOHN L. $\overset{\text{his}}{+}$ CHADWICK.
mark.

Witnesses:
T. C. CHANDLER,
EDMUND JOST.